US009324305B2

(12) United States Patent
Na et al.

(10) Patent No.: US 9,324,305 B2
(45) Date of Patent: Apr. 26, 2016

(54) METHOD OF SYNTHESIZING IMAGES PHOTOGRAPHED BY PORTABLE TERMINAL, MACHINE-READABLE STORAGE MEDIUM, AND PORTABLE TERMINAL

(71) Applicant: Samsung Electronics Co., Ltd., Gyeonggi-do (KR)

(72) Inventors: Jin-Hee Na, Seoul (KR); Ki-Huk Lee, Gyeonggi-do (KR); Young-Kwon Yoon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 43 days.

(21) Appl. No.: 14/185,034

(22) Filed: Feb. 20, 2014

(65) Prior Publication Data

US 2014/0232743 A1    Aug. 21, 2014

(30) Foreign Application Priority Data

Feb. 21, 2013    (KR) .................. 10-2013-0018524

(51) Int. Cl.
| | | |
|---|---|---|
| *G09G 5/377* | (2006.01) | |
| *H04N 5/262* | (2006.01) | |
| *H04N 5/225* | (2006.01) | |
| *H04N 1/32* | (2006.01) | |

(52) U.S. Cl.
CPC ........... *G09G 5/377* (2013.01); *H04N 1/32144* (2013.01); *H04N 5/2258* (2013.01); *H04N 5/2621* (2013.01); *H04N 2201/3245* (2013.01); *H04N 2201/3273* (2013.01)

(58) Field of Classification Search
CPC ... H04N 5/272; H04N 5/2258; H04N 5/2621; H04N 5/2628; H04N 5/23293; H04N 5/23219; H04N 5/225; G09G 2340/0464; G09G 2340/10; G09G 2340/12; G09G 5/377
USPC .......................... 345/633, 634; 382/284, 293; 348/E5.058, 333.11
See application file for complete search history.

(56) References Cited

U.S. PATENT DOCUMENTS

| | | | | |
|---|---|---|---|---|
| 2005/0264668 | A1* | 12/2005 | Miyamoto | ............... 348/333.11 |
| 2006/0033754 | A1* | 2/2006 | Evans | ..................... G06T 11/60 345/629 |
| 2006/0125928 | A1* | 6/2006 | Wolcott et al. | ............. 348/211.2 |
| 2009/0244296 | A1* | 10/2009 | Petrescu et al. | .......... 348/207.99 |
| 2012/0069001 | A1* | 3/2012 | Yamaji | .................... G06T 11/60 345/419 |
| 2012/0105703 | A1* | 5/2012 | Lee | ......................... G06T 11/60 348/333.11 |
| 2012/0158256 | A1* | 6/2012 | Kuboyama et al. | ............. 701/51 |
| 2012/0268552 | A1* | 10/2012 | Choi et al. | .................. 348/14.07 |
| 2012/0274808 | A1* | 11/2012 | Chong et al. | .................. 348/234 |
| 2014/0035950 | A1* | 2/2014 | Jonsson | .................. G06T 11/60 345/629 |
| 2014/0201023 | A1* | 7/2014 | Tang | .................. G06Q 30/0643 705/26.5 |

FOREIGN PATENT DOCUMENTS

KR    10-2007-0117284 A    12/2007

* cited by examiner

*Primary Examiner* — Jin-Cheng Wang
(74) *Attorney, Agent, or Firm* — Cha & Reiter, LLC.

(57) ABSTRACT

A system generates a synthesized image by combining content of a first image with content of a second image where both the first and second images are acquired by a portable terminal, The system identifies a portion of the second image, selects at least a part of the portion of the second image as a region of interest and generates a synthesized image by incorporating content of the first image in the region of interest. The method displays and stores the synthesized image.

13 Claims, 14 Drawing Sheets

METHOD OF SYNTHESIZING IMAGES PHOTOGRAPHED BY PORTABLE TERMINAL, MACHINE-READABLE STORAGE MEDIUM, AND PORTABLE TERMINAL

CLAIM OF PRIORITY

This application claims the priority under 35 U.S.C. §119 (a) to Korean Application Serial No. 10-2013-0018524, which was filed in the Korean Intellectual Property Office on Feb. 21, 2013, the entire content of which is hereby incorporated by reference.

BACKGROUND

1. Technical Field

The present disclosure concerns a system for synthesizing images using image data acquired by a portable terminal.

2. Description of the Related Art

Virtual reality refers to an environment or a situation created by computer graphics and representing reality in certain aspects and involves an interface enabling a user to experience an environment or situation through sensory organs and interact with the virtual reality environment in real time. Thereby a user may interact with the virtual reality environment through operation of a device, and experience a sensory experience similar to reality. Furthermore, augmented reality is a field of virtual reality involving computer graphics displaying an object in an original environment by synthesizing a virtual object or information within an actual environment. Augmented reality overlaps a real world as perceived by a user by concurrent display of a real world together with a virtual object and may be referred to as Mixed Reality (MR) environment in which additional information or a virtual world is added to the real world and displayed as one image.

Similar to mixed reality, a dual shot mode concurrently displays in a single screen of a portable terminal a front image photographed by a front camera facing a user and a rear image acquired by a rear camera facing a direction in which a user views an object. A known dual shot mode displays a combined front image and rear image with a front image being fixed to a specific predetermined position of the rear image regardless of the contents of the rear image. A system according to invention principles addresses this deficiency and related problems.

SUMMARY

A system according to invention principles advantageously provides a preview image and performs dual shot image acquisition in a portable device with front and rear cameras by positioning a front acquisition image in a desired area of a rear image. The system improves integrity of front and rear images by synthesizing an image comprising a rear camera image incorporating a front camera image in a particular part of the rear camera image to provide a synthesized resultant image even though the composition of the rear image is partially changed.

A method generates a synthesized image by combining content of a first image with content of a second image where the first and second images are acquired by a portable terminal. The method identifies a portion of the second image, selects at least a part of the portion of the second image as a region of interest, transforms first image content by at least one of scaling, rotation and translation operations and generates a synthesized image by incorporating transformed content of the first image in the region of interest. The method displays and stores the synthesized image.

In a feature of the invention, the method generates a synthesized image by combining transformed first image pixel luminance content into the portion of the second image by at least one of, image warping, texture mapping, addition, substitution, merging, overlay, superimposition and weighted combination of luminance pixel content to provide a combined image of the first and second images. The method identifies a portion of a second image in response to at least one of, texture information about the second image, learned information pre-stored in a database and information supporting identifying a region designated by a user. In selecting the region of interest, the method displays a plurality of candidate regions of interest corresponding to portions of the second image and selects one of the plurality of candidate regions of interest in response to an input of the user. Further, the first image is mapped to each of the plurality of regions of interest to be displayed. The portion of the second image corresponds to a region designated by the user in the second image. The method changes the region of interest to another region of interest corresponding to another part of second image in response to input data and modifies the region of interest in response to an input of a user.

In another feature of the invention, the detects a change in the portion of the second image, modifies the region of interest so as to correspond to the changed portion of the second image and maps the first image to the modified region of interest and displays the mapped image. The method further detects a change in positions of corner characteristic points defining the portion of the second image, modifies the region of interest so as to correspond to the position-changed corner characteristic points and maps the first image to the modified region of interest and displays the mapped image. In an embodiment, the region of interest corresponds to one surface of a building or an object, and an area of the one surface is limited by corner characteristic points or edges. Further, the portion of the second image is identified and the first image is automatically mapped to the region of interest to be displayed and the first and second images are images acquired at substantially the same time.

In yet another feature of the invention, a portable terminal, comprises, a first camera that acquires a first image; a second camera that acquires a second image; a storage unit that stores the first and second images; a display unit that displays the first and second images on a screen; and a controller. The controller, identifies a portion of the second image; selects at least a part of the portion of the second image as a region of interest; generates a synthesized image by incorporating content of the first image in the region of interest; and stores the synthesized image. Further, the region of interest corresponds to one surface of a building or a subject, and an area of the one surface is limited by corner characteristic points or edges.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
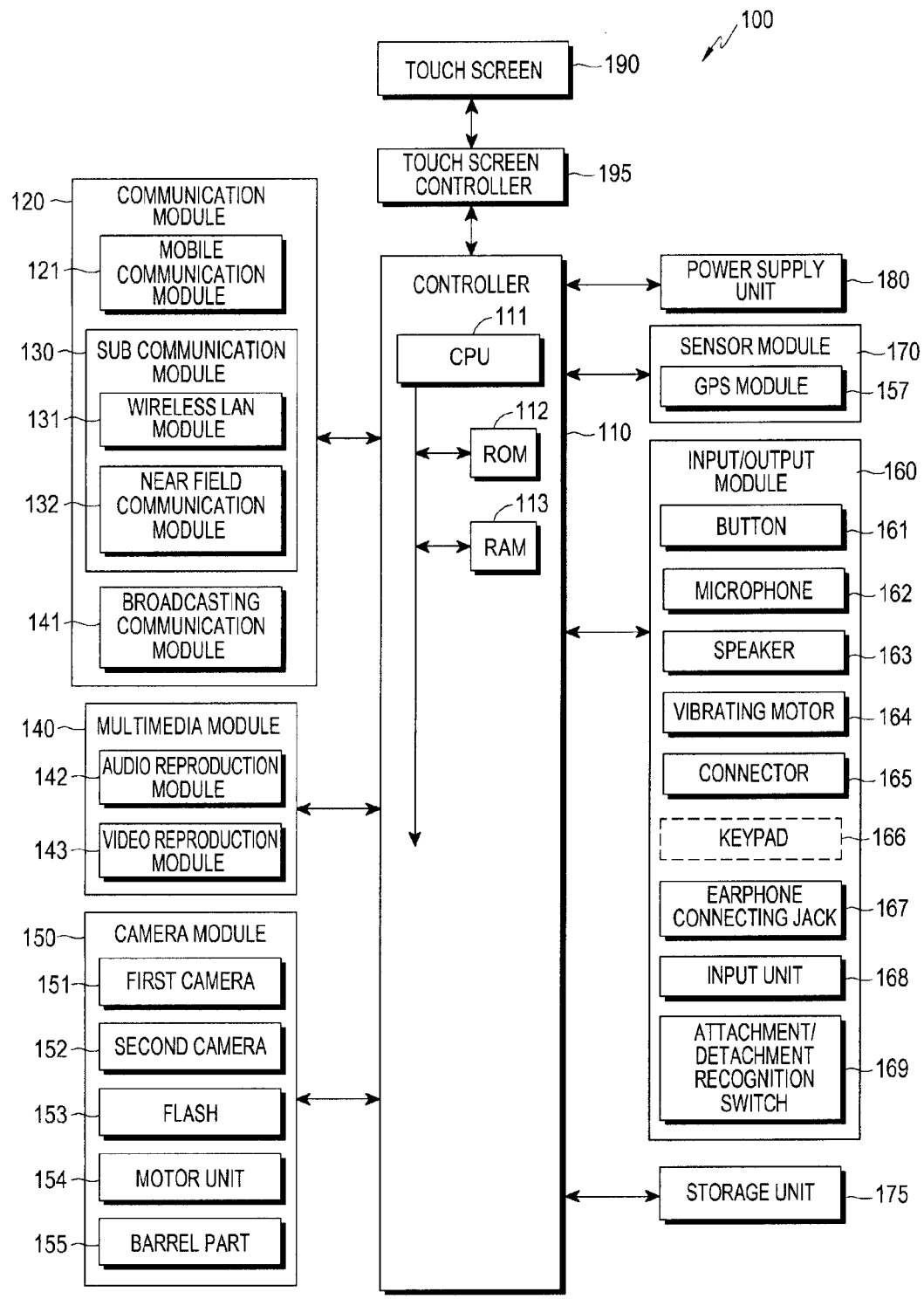
FIG. 1 shows a schematic block diagram illustrating a portable terminal according to invention principles.

The present invention may be variously modified and have various embodiments, so that the specific embodiments will be described with reference to the drawings in detail. However, it is not intended to limit the present invention to the specific embodiments, and it will be appreciated that the present invention includes all modifications, equivalences, or substitutions included in the spirit and the technical scope of the present invention.

Terms including an ordinary number, such as first and second, are used for describing various constituent elements, but the constituent elements are not limited by the terms. The terms are used only to discriminate one constituent element from another constituent element. For example, without departing from the scope of the invention, a first constituent element may be named as a second constituent element, and similarly a second constituent element may be named as a first constituent element. A term "and/or" includes a combination of multiple relevant described items or any one of the multiple relevant described items.

Terms used in the present application are used only to describe specific exemplary embodiments, and are not intended to limit the present invention. Singular expressions used herein include plurals expressions unless they have definite opposite meanings. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other specific characteristics, numbers, steps, operations, constituent elements, and components, or a combination thereof in advance.

All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application.

In the present invention, a terminal may be an arbitrary device including a touch screen, and the terminal may be referred to as a portable terminal, a mobile terminal, a communication terminal, a portable communication terminal, a portable mobile terminal, or the like. Image "synthesis" as used herein comprises generation of a synthesized image by combining a first image (e.g. acquired by a front camera of a device) and a second image (e.g. acquired by a rear camera of a device). Specifically, combining may be implemented by transforming a first image by scaling, rotation and translation operations, for example, and incorporating the transformed first image pixel luminance content into a portion of a second image by image warping, texture mapping, addition, substitution, merging, overlay, superimposition, weighted combination of luminance pixel content or other processing to provide a combined image of the first and second image.

Texture Mapping and Image Warping as used herein are known image processing methods as described in "Fundamentals of Texture Mapping and Image Warping" by Paul S. Heckbert, EECS Department, University of California, Berkeley Technical Report No. UCB/CSD-89-516, June 1989.

For example, the terminal may include a smart phone, a mobile phone, a game player, a TV, a display device, a head unit for a vehicle, a notebook computer, a laptop computer, a tablet computer, a Personal Media Player (PMP), a watch and Personal Digital Assistants. The terminal may be implemented as a pocket-sized portable communication terminal having a wireless communication function. Further, the terminal may be a flexible device or a flexible display device. A representative configuration of the terminal is related to a portable phone, and partial constituent elements in the representative configuration of the terminal may be omitted or changed.

FIG. 1 shows a portable terminal system. The portable terminal 100 may be connected with an external electronic device (not shown) using at least one of a communication module 120, a connector 165, and an earphone connecting jack 167. The electronic device may include one among various devices, such as earphones, an external speaker, a Universal Serial Bus (USB) memory, a charger, a cradle/dock, a DMB antenna, a mobile payment related device, a health management device (such as a blood-sugar testing device), a game playing device, a vehicle navigation device, detachable and connected via wire to the portable terminal 100. Further, the electronic device may include a Bluetooth communication device, a Near Field Communication (NFC) device, a WiFi direct communication device, or an Access Point (AP), which may establish a wireless connection. Further, the portable terminal 100 may be connected to another portable terminal or one of the electronic devices, for example, a portable phone, a smart phone, a tablet PC, a desktop PC, and a server in wire or wirelessly.

The portable terminal 100 may include at least one touch screen 190 and at least one touch screen controller 195. Further, the portable terminal 100 may include a controller 110, the mobile communication module 120, a multimedia module 140, a camera module 150, an input/output module 160, a sensor module 170, a storage unit 175, and a power supply unit 180. The communication module 120 may include a mobile communication module 121, a sub communication module 130, and a broadcasting communication module 141.

The sub communication module 130 includes at least one of a wireless LAN module 131 and a near field communication module 132, and the multimedia module 140 includes at least one of an audio reproduction module 142 and a video reproduction module 143. The camera module 150 includes at least one of a first camera 151 and a second camera 152. Further, the input/output module 160 includes at least one of a button 161, a microphone 162, a speaker 163, a vibrating motor 164, a connector 165, and a keypad 166.

The controller 110 may include a CPU 111, a ROM 112 for storing a control program for controlling the portable terminal 100, and a RAM 113 for storing a signal or data input from the outside of the portable terminal 100 or used as a storage area for an operation performed by the portable terminal 100. The CPU 111 may include a single core, dual cores, triple cores, or quad cores. The CPU 111, the ROM 112, and the RAM 113 may be connected with each other through an internal bus. Further, the controller 110 may control the communication module 120, the multimedia module 140, the camera module 150, the input/output module 160, the sensor module 170, the storage unit 175, the power supply unit 180, the touch screen 190, and a touch screen controller 195.

The controller 110 detects a user input according to a touch of a user, an approach to, or a close location to any one object by a user input means, such as an input unit 168 or a finger of the user, capable of generating a touch in a state where a plurality of objects or items is displayed on the touch screen 190, and identifies the object corresponding to the position on the touch screen 190 at which the user input is generated. The user input through the touch screen 190 includes one of a direct touch input of directly touching an object, and a hovering input, which is an indirect touch input, of approaching an object within a predetermined recognized distance without directly touching the object. For example, when the input unit 168 is located close to the touch screen 190, an object positioned in a perpendicularly downward direction of the input unit 168 may be selected. The user input includes a gesture input through the camera module 150, a switch/button input through the button 161 or the keypad 166, a voice input through the microphone 162, or the like, in addition to the user input through the touch screen 190.

The object or the item (or a functional item) is displayed or displayable on the touch screen 190 of the portable terminal 100, and represents at least one of, for example, an application, a menu, a document, a Widget, a picture, a video, E-mail, SMS messages, and MMS messages, and may be selected, executed, deleted, cancelled, stored, and changed by the user input means. The item may also be used as a meaning generally including a button, an icon (or a shortcut icon), a thumbnail image, or a folder storing at least one object in a portable terminal. Further, the item may be displayed in a form of an image, a text, or the like.

The shortcut icon, which is an image element displayed on the touch screen 190 of the portable terminal 100 facilitates execution of an application, a call, address book access, a menu, or the like. Further, the controller 110 detects a user input event, such as a hovering event, according to an approach or a close location of the input unit 168 to the touch screen 190. When the user input event is generated for a predetermined item or according to a predetermined method, the controller 110 performs a predetermined program operation corresponding to the user input event.

The controller 110 outputs a control signal to the input unit 168 or the vibrating motor 164. The control signal includes information indicating a vibration pattern used by the input unit 168 to generate a vibration according to the vibration pattern. The information on the vibration pattern may represent the vibration pattern itself or an identifier of the vibration pattern. The control signal may comprise a request for generation of a vibration. The mobile communication module 121 enables the portable terminal 100 to be connected with an external electronic device through mobile communication by using at least one antenna or a plurality of antennas (not shown) in response to control of the controller 110. The mobile communication module 121 transceives a wireless signal for a voice call, a video call, a Short Message Service (SMS), or a Multimedia Messaging Service (MMS) with a portable phone (not shown), a smart phone (not shown), a tablet PC, or another electronic device (not shown) having a telephone number input in the portable terminal 100. The wireless LAN module 131 is connected to the Internet. The wireless LAN module 131 supports the wireless LAN standard (IEEE802.11x) of the Institute of Electrical and Electronics Engineers (IEEE). The near field communication module 132 may wirelessly establish near field communication between the portable terminal 100 and an external electronic device according to the control of the controller 110. The near field communication method may include Bluetooth, Infrared Data Association (IrDA), WiFi-Direct communication, Near Field Communication (NFC), or the like.

The broadcasting communication module 141 receives a broadcasting signal (for example, a TV broadcasting signal, a radio broadcasting signal, or a data broadcasting signal) and additional broadcasting information (for example, an Electronic Program Guide (EPG) or an Electronic Service Guide (ESG)) transmitted from a broadcasting station through a broadcasting communication antenna (not shown) according to the control of the controller 110.

The multimedia module 140 includes the audio reproduction module 142, or the video reproduction module 143. The audio reproduction module 142 reproduces a digital audio file (for example, a file having a file extension of mp3, wma, ogg, or way) stored in the storage unit 175 or received through the communication module 120 according to the control of the controller 110. The video reproduction module 143 reproduces a digital video file (for example, a file having a file extension of mpeg, mpg, mp4, avi, mov, or mkv) stored or received in response to the control of the controller 110. The multimedia module 140 may be integrated into the controller 110. The camera module 150 includes at least one of the first camera 151 and the second camera 152 for photographing a still image or a video in response to the control of the controller 110. Further, the camera module 150 includes at least one of a barrel part 155 for performing zoom-in and zoom-out functions for photographing a subject, a motor unit 154 for controlling a movement of the barrel part 155, and a flash 153 for providing auxiliary light source required for photographing a subject. The first camera 151 is disposed in a front surface of the portable terminal 100, and the second camera 152 is disposed in a rear surface of the portable terminal 100.

Each of the first and second cameras 151 and 152 includes a lens system, and an image sensor and converts an optical signal comprising an image acquired through the lens system to an electrical image signal and outputs the converted electrical image signal to the controller 110, and a user may acquire a video or a still image through the first and second cameras 151 and 152. The input/output module 160 may comprise a cursor control, such as a mouse, a trackball, a joystick, or cursor direction keys, to control a movement of a cursor on the touch screen 190. The button 161 may be formed on a front surface, a side surface, or a rear surface of a housing of the portable terminal 100, and may include at least one of a power/lock button (not shown), a volume button (not shown), a menu button, a home button, a back button, and a search button. The microphone 162 generates an electrical signal by receiving a voice or a sound in response to the control of the controller 110.

The speaker 163 outputs sounds corresponding to various signals or data (for example, wireless data, broadcasting data, digital audio data, or digital video data) to the outside of the portable terminal 100 in response to the control of the controller 110. The speaker 163 may output a sound (for example, a button operation sound, a call connection sound, and when making a telephone call, the voice of a counterpart user) corresponding to a function performed by the portable terminal 100. One or multiple speakers 163 may be formed at an appropriate position or appropriate positions of the housing of the portable terminal 100.

The vibration motor 164 converts an electrical signal to a mechanical vibration in response to control by the controller 110. For example, in a case where the portable terminal 100 in a vibration mode receives a voice or video call from another electronic device (not shown), the vibration motor 164 is operated. One or multiple vibration devices 164 may be provided inside the housing of the portable terminal 100. The vibration element 164 is also operated in response to a user input through the touch screen 190. The connector 165 comprises an interface for connecting the portable terminal 100 with an external electronic device or a power source (not shown). The controller 110 transmits data stored in the storage unit 175 of the portable terminal 100 to an external electronic device and receives data from an external electronic device through a wired cable connected to the connector 165. The portable terminal 100 receives power from a power source through the wired cable connected to the connector 165, or charges a battery (not shown) by using the power source.

The keypad 166 receives a key input from the user for the control of the portable terminal 100 and includes a physical keypad (not shown) provided on the portable terminal 100 or a virtual keypad (not shown) displayed on the touch screen 190. The earphones (not shown) may be inserted in the earphone connecting jack 167 to be connected to the portable terminal 100. An attachment/detachment recognition switch 169 operated in response to mounting and detachment of the input unit 168 is provided in one region inside the portable terminal 100 in which the input unit 168 is inserted, and the attachment/detachment recognition switch 169 outputs a signal in response to the mounting or the separation of the input unit 168, to the controller 110. The attachment/detachment recognition switch 169 is configured to be in direct or indirect contact with the input unit 168 when the input unit 168 is mounted. Accordingly, the attachment/detachment recognition switch 169 generates a signal (a signal notifying the mounting or the separation of the input unit 168) in response to the mounting or the separation of the input unit 168 based on the attachment to or the detachment from the input unit 168, and outputs the generated signal to the controller 110.

The sensor module 170 includes at least one sensor detecting a state of the portable terminal 100. For example, the sensor module 170 includes at least one sensor, such as a proximity sensor detecting whether a user approaches the portable terminal 100, an illumination sensor (not shown) detecting a quantity of light around the portable terminal 100, or a motion sensor (not shown) detecting a motion (for example, a rotation of the portable terminal 100, or acceleration or vibration applied to the portable terminal 100) of the portable terminal 100, a geo-magnetic sensor (not shown) detecting a point of the compass of the portable terminal 100 by using the earth's magnetic field, a gravity sensor detecting an application direction of gravity, an altimeter detecting an altitude by measuring pressure of the atmosphere, or the GPS module 157. The GPS module 157 receives radio waves from a plurality of GPS satellites (not shown) in orbit around the earth, and calculates a position of the portable terminal 100 by using a time of arrival of the radio waves from the GPS satellites (not shown) to the portable terminal 100.

The storage unit 175 stores an input/output signal or data supporting operation of the communication module 120, the multimedia module 140, the camera module 150, the input/output module 160, the sensor module 170, or the touch screen 190 in response to the control of the controller 110. The storage unit 175 stores at least one control program and applications for the control of the portable terminal 100 and the controller 110. The storage unit 175 comprises a non-volatile memory, a volatile memory, a Hard Disk Drive (HDD), or a Solid State Drive (SSD). Further, the storage unit 175 stores a variety of applications such as navigation, video call, game, time-based alarm applications, and the like, images for providing Graphic User Interfaces (GUIs) related to the applications, user information, documents, databases or data related to a method of providing a synthesized image, background images (menu images, an idle screen, or the like) or operation programs necessary for driving the portable terminal 100, images photographed by the camera module 150, or the like. Further, the storage unit 175 may comprise a machine (for example, a computer) readable medium comprising a medium providing data to the machine so as to enable the machine to perform a specific function. The storage unit 175 includes a non-volatile medium or a volatile medium of a concrete type so that commands transmitted by the medium may be detected by a physical mechanism for reading the commands through the machine. The machine readable medium includes at least one of a floppy disk, a flexible disk, a hard disk, a magnetic tape, a Compact Disc Read-only Memory (CD-ROM), an optical disk, a punch card, a paper tape, a RAM, a Program Read-Only Memory (PROM), an Erasable PROM (EPROM), and a flash-EPROM, but is not limited thereto.

The power supply unit 180 supplies power to one or multiple batteries disposed in the housing of the portable terminal 100 in response to the control of the controller 110. One or multiple batteries supply power to the portable terminal 100. Further, the power supply unit 180 supplies power input from an external power source to the portable terminal 100 through the wired cable connected with the connector 165. Further, the power supply unit 180 may also supply power wirelessly input from an external power source to the portable terminal 100 through a wireless charging technique. Further, touch screen 190 provides a user with user graphic interfaces corresponding to various services (for example, a call, data transmission, broadcasting, and photographing). The touch screen 190 may output an analog signal corresponding to at least one user input, which was input into a user graphic interface, to the touch screen controller 195. The touch screen 190 may receive at least one user input through the body of a user (for example, a finger including a thumb) or the input unit 168 (for example, a stylus pen and an electronic pen). The touch screen 190 receives and detects a drag input or a drag gesture.

A touch is not limited to a contact between the touch screen 190 and a finger or the input unit 168, and may include non-contact (for example, a case where the user input means is positioned within a recognition distance (for example, 1 cm) within which the user input means is detectable without a direct contact with the touch screen 190). The distance or an interval within which the user input means is recognizable by the touch screen 190 may be changed and a direct touch event is distinguished from a hover event. The touch screen 190 may be implemented by, for example, a resistive method, a capacitive method, an infrared method, or an acoustic wave method, or a combination thereof. Further, the touch screen 190 may include at least two touch panels capable of detecting a touch or an approach of a finger and the input unit 168, respectively, so as to receive inputs by the finger and the input unit 168, respectively. At least two touch panels provide the touch screen controller 195 with different output values, and the touch screen controller 195 differently recognizes values input from at least two touch panels, so that it is possible to discriminate whether the input from the touch screen 190 is the input by the finger or by the input unit 168.

The touch screen controller 195 converts an analog signal input from the touch screen 190 to a digital signal to transmit the converted digital signal to the controller 110. The controller 110 controls the touch screen 195 by using the digital signal received from the touch screen controller 190. For example, the controller 110 permits a shortcut icon (not shown) or an object displayed on the touch screen 190 to be selected or executed in response to the direct touch event or the hovering event. Further, the touch screen controller 195 may be integrated to the controller 110. The touch screen controller 195 identifies a hover interval distance, as well as a position of a user input, by detecting the value (for example, a current value) output through the touch screen 190, and also converts the identified distance value to a digital signal (for example, a z-coordinate) and provides the controller 110 with the converted digital signal. Further, the touch screen controller 195 detects a pressure with which the user input means presses the touch screen 190 by detecting the value (for example, a current value) output through the touch screen 190, and also converts the identified pressure value to a digital signal and provides the controller 110 with the converted digital signal.

Figure 2:
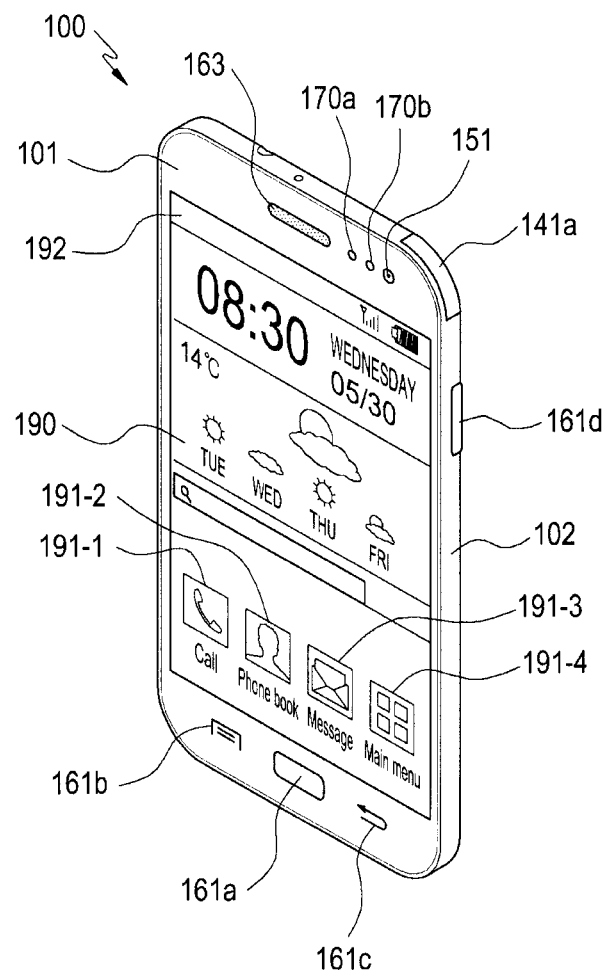
FIG. 2 shows a front perspective view of the portable terminal according to invention principles.
Figure 3:
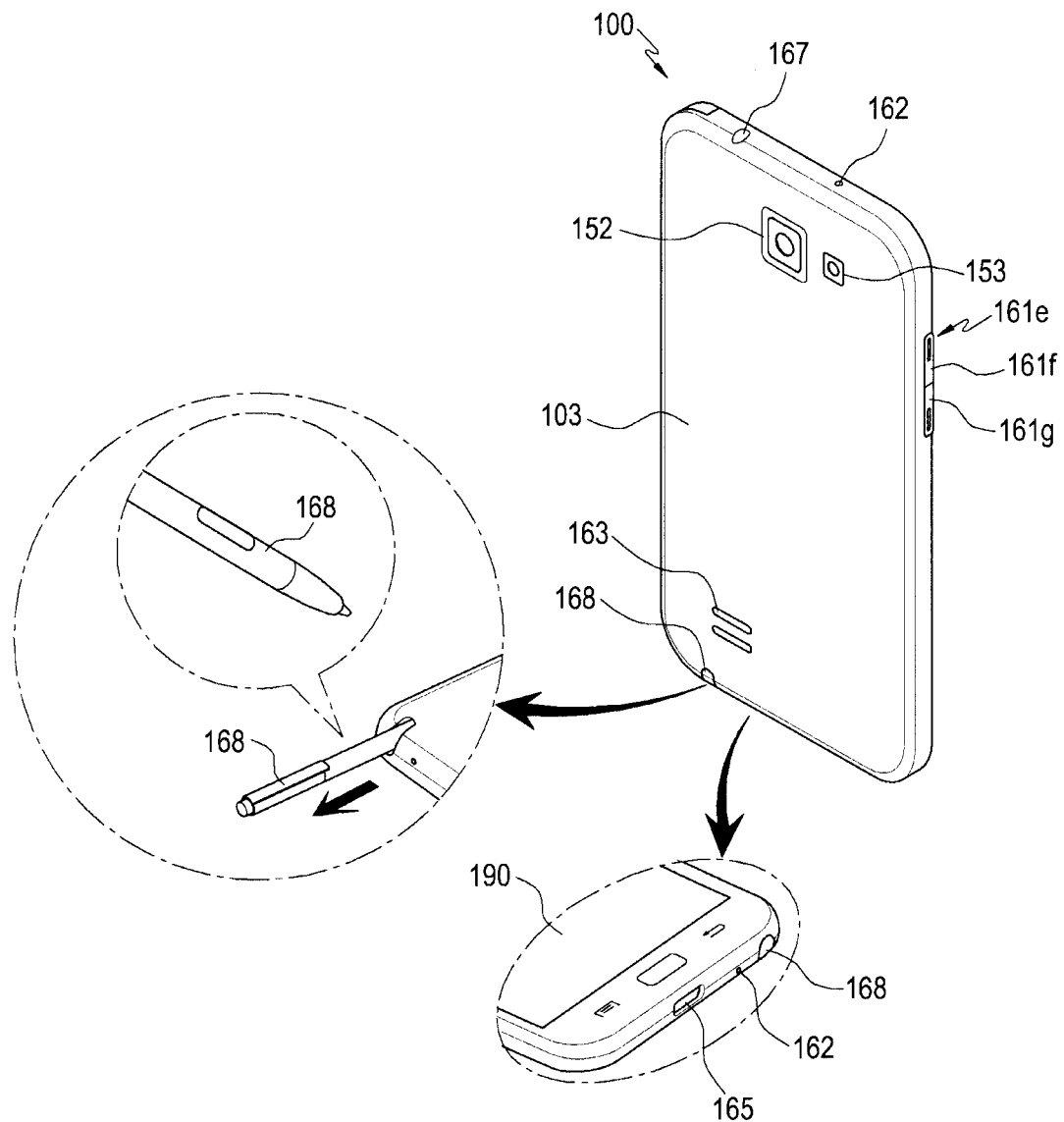
FIG. 3 shows a rear perspective view of the portable terminal according to invention principles.

FIG. 2 shows a front perspective view of the portable terminal and FIG. 3 shows a rear perspective view of the portable terminal. Referring to FIGS. 2 and 3, the touch screen 190 is disposed in the center of a front surface 101 of the portable terminal 100. The touch screen 190 may be formed to be a large size so as to occupy most of the front surface 101 of the portable terminal 100. FIG. 2 illustrates an example in which a main home screen is displayed on the touch screen 190. The main home screen is a first screen displayed on the touch screen 190 when power of the portable terminal 100 is turned on. Further, in a case where the portable terminal 100 has several different home screens with several pages, the main home screen may be the first home screen among the several pages of home screens. Shortcut icons 191-1, 191-2, and 191-3 for executing frequently used applications and a main menu switching key 191-4 as well as the time and weather, for example, may be displayed on the home screen. When the user selects the main menu switching key 191-4, the menu screen is displayed on the touch screen 190. Further, a status bar 192 displaying a status of the portable terminal 100, such as a battery charging state, an intensity of a received signal, and/or a current time may also be provided at an upper end of the touch screen 190.

A home button 161a, a menu button 161b, and a back button 161c are provided at a lower portion of the touch screen 190.

The home button 161a displays the main home screen on the touch screen 190. For example, when the home button 161a is selected in a state when another home screen different from the main home screen or the menu screen is displayed on the touch screen 190, the main home screen is displayed on the touch screen 190. Further, when the home button 161a is selected during the execution of the applications on the touch screen 190, the main home screen illustrated in FIG. 2 may be displayed on the touch screen 190. Further, the home button 161a may also be used so as to display recently used applications on the touch screen 190, or display a task manager. The menu button 161b provides a connection menu displayable on the touch screen 190. The connection menu may include a widget addition menu, a background image change menu, a search menu, an edit menu or a setting menu for example. The back button 161c is used for displaying a screen executed just before a currently executed screen, or terminating the most recently used application.

The first camera 151, the illumination sensor 170a, and the proximity sensor 170b are disposed at an edge of the front surface 101 of the portable terminal 100. The second camera 152, the flash 153, and the speaker 163 are disposed on the rear surface 103 of the portable terminal 100. For example, the power/lock button 161d, a volume button 161e including a volume up button 161f and a volume down button 161g, a territorial DMB antenna 141a for receiving broadcasting, and one or more microphones 162 are disposed at the side surface 102 of the portable terminal 100. The DMB antenna 141a may be fixed to the portable terminal 100 or be detachably formed. Further, the connector 165 is provided on a side surface of the lower end of the portable terminal 100. The connector 165 is provided with a plurality of electrodes, and may be connected with an external electronic device through a wire. The earphone connecting jack 167 may be provided on a side surface of the upper end of the portable terminal 100. The earphones may be inserted into the earphone connecting jack 167. Further, the input unit 168 may be mounted on the side surface of the lower end of the portable terminal 100. The input unit 168 may be inserted inside the portable terminal 100 and be withdrawn from the portable terminal 100 for use.

The system provides an image obtained by synthesizing a rear image acquired by the second camera using a front image acquired by the first camera. The rear direction is a direction facing the rear surface of the portable terminal 100, and the front direction is a direction facing the front surface of the portable terminal 100, and the front direction represents one direction, and the rear direction represents an opposite direction. The controller 110 controls operation of the portable terminal 100, and the controller 110 performs generation of a synthesized image by controlling elements within the portable terminal 100.

Figure 4:
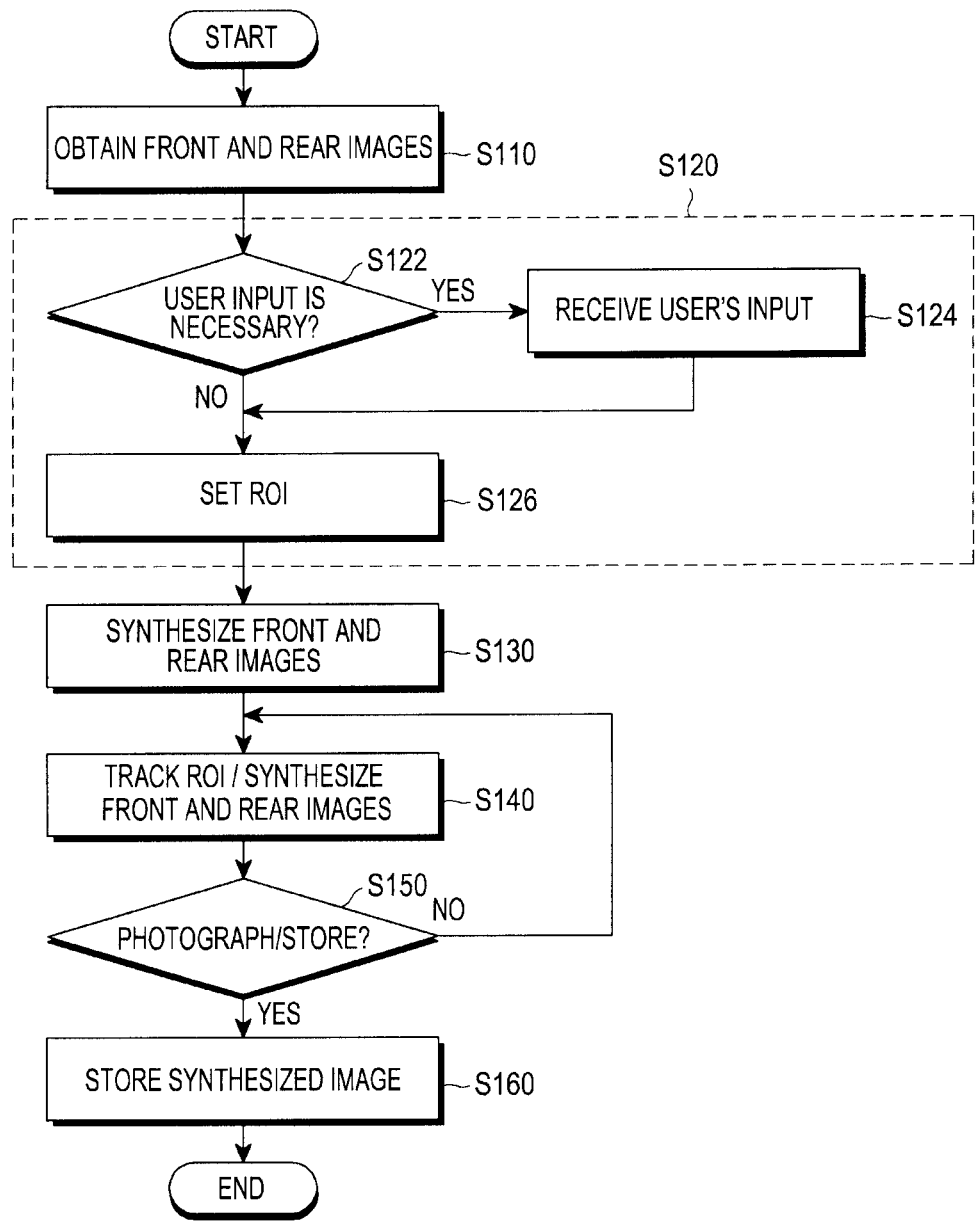
FIG. 4 shows a flowchart of a method of providing a synthesized image according to invention principles.
Figure 5A:
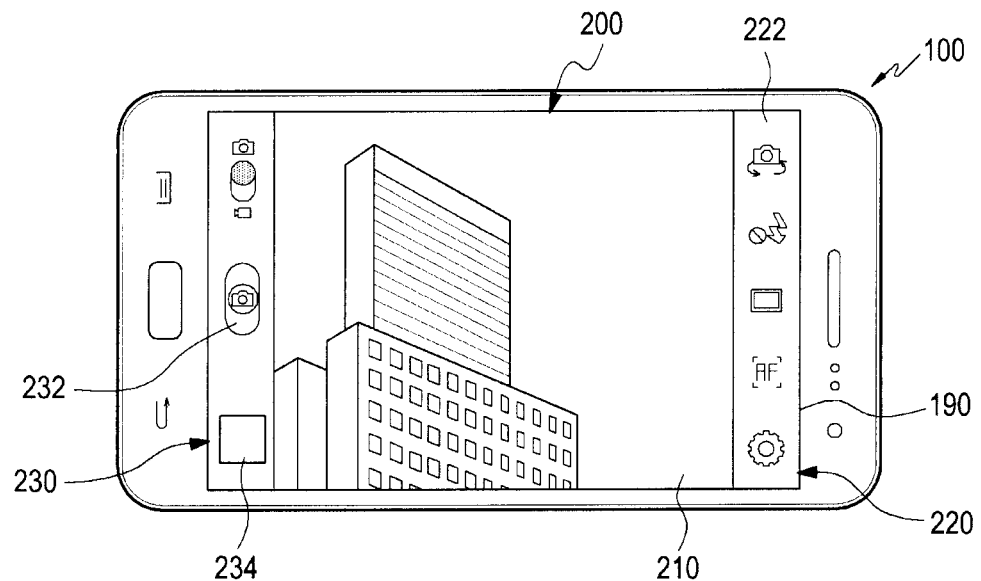
FIG. 5A and FIG. 5B illustrate a camera application image window.
Figure 5B:
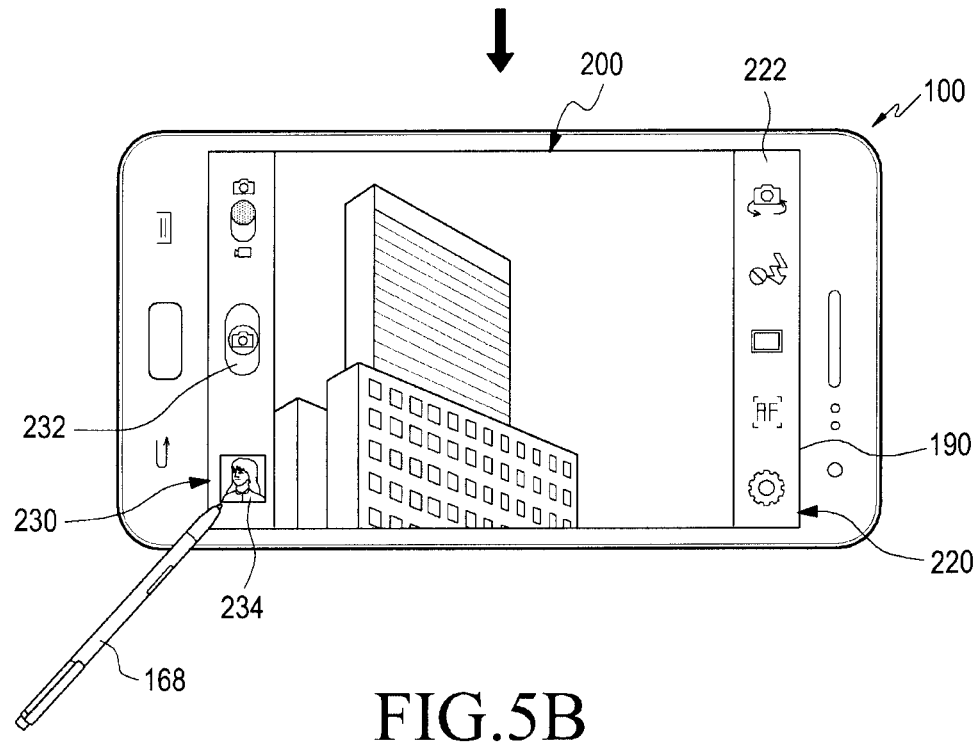

FIG. 4 shows a flowchart of a method of providing a synthesized image, and FIGS. 5A and 5B illustrate a camera application image window. In step S110 (or in S130 in another embodiment) the portable terminal 100 acquires front and rear images and the controller 110 stores the front image acquired by the first camera 151 and the rear image acquired by the second camera 152 in the storage unit 175. The front and rear images may be live preview images or real-time images. A user initiates execution of a camera application and a camera application image window 200 is displayed on the touch screen 190. In order to execute the camera application, the user presses the button 161 or touches the touch screen 190 to select an icon representing the camera application. To select the application alternatively, a user inputs a predetermined pattern (for example, a double tap, a motion of narrowing or widening two fingers in a state where the two fingers touch the touch screen 190, or a motion of drawing a circle in a state where one finger touches the touch screen 190, for example) to the touch screen 190, inputs a voice command through the microphone 162, inputs a gesture or a motion through the camera module 150, or wirelessly inputs a specific command through the communication module 120. A first menu 220, a second menu 230, and the rear image 210 are displayed on the camera application image window 200. In this case, the first menu 220 includes a setting button and an image switching button 222, for example, and the second menu 230 includes a photographing button 232 and a switched image region 234, for example.

When the user touches the switched image region 234 or selects the image switching button 222, the front image to replace the rear image 210 is displayed on the switched image region 234 of the second menu 230. The front image represents a user and the rear image represents front and rear buildings. In a different embodiment, when the camera application is executed, the front image is automatically displayed on the switched image region 234. The controller 110 sets a Region Of Interest (ROI) corresponding to a region of the rear image to which the front image is to be incorporated to create a synthesized image. In steps S122 and S124 if necessary, a user selects one candidate ROI from a plurality of candidate ROIs. Alternatively, the controller 110 may automatically select the ROI in step S126. Steps S122 and S124 may be omitted. In step S122 controller 110 determines whether a user input is necessary to select one ROI in the rear image. In different embodiments, at least one candidate ROI is recognized in the rear image and a user selection or identification is received to select one ROI or a user configures a predetermined setting identifying an ROI, or a user inputs an ROI selection command. Controller 110 performs step S124 if user input is necessary, and if user input is not necessary, controller 110 performs step S126. When a plurality of candidate ROIs are automatically recognized in the rear image, the controller 110 automatically selects an appropriate single ROI from the plurality of candidate ROIs. For example, the controller 110 may set a front surface, a rear surface, a side surface, an upper surface, or a lower surface of a building or an object (that is, one surface of a building or an object) as a ROI. In this case, an area of one surface of the building or the object may be limited by corner characteristic points and/or edges. In step S124 controller 110 receives the user input for selection of the ROI through the touch screen 190 or the input/output module 160, for example. In step S126 controller 110 sets the ROI automatically or in response to user input command.

In step S130 the controller 110 generates a synthesized image of the front and rear images by overlaying a portion of the front image on the selected ROI automatically or on response to user input, and displays the generated synthesized image to the user. In this case, the front and rear images are images acquired at the same time point. The controller 110 recognizes and analyzes the rear image, and selects a candidate ROI for incorporation of the front image. The controller 110 automatically recognizes and selects a candidate ROI based on texture information (characteristic points, texture, a degree of a plane (or a degree of a curve)). The controller 110 also recognizes a part of a subject in the rear image, and selects the recognized part of the subject as a candidate ROI. The characteristic point may be an edge, a corner or an image pattern, for example, and the controller 110 selects the candidate ROI based exclusively in one embodiment, on non-learned information (or not-predetermined information), such as an edge and a corner. In another embodiment, controller 110 select the candidate ROI based on learned information, such as image patterns pre-stored as a database as well as non-learned information.

For example, the controller 110 may select a plane in the rear image as an image object meeting predetermined accuracy threshold values as the candidate ROI by repeating the steps of detecting characteristic points in the rear image, estimating a plane limited by the partial characteristic points, and calculating the accuracy of the estimated plane. A characteristic point is specified by a 3D coordinate value, and a known Simultaneous localization And Mapping (SLAM) method is used in one embodiment, for obtaining a 3D coordinate value. Alternatively, the controller 110 selects a partial region in which a large number of corner characteristic points are distributed as the candidate ROI by sequentially searching partial regions in the rear image. In this case, the partial region may be the estimated plane. In another embodiment, the controller 110 stores information (information about an object image and/or characteristic points of an object image) about a pre-learned object or a partial region of an object (for example, a plane) in a database, and select a region corresponding to the learned object in the rear image as the candidate ROI. A user may alternatively directly designate a partial region of the rear image as the ROI.

Figure 6A:
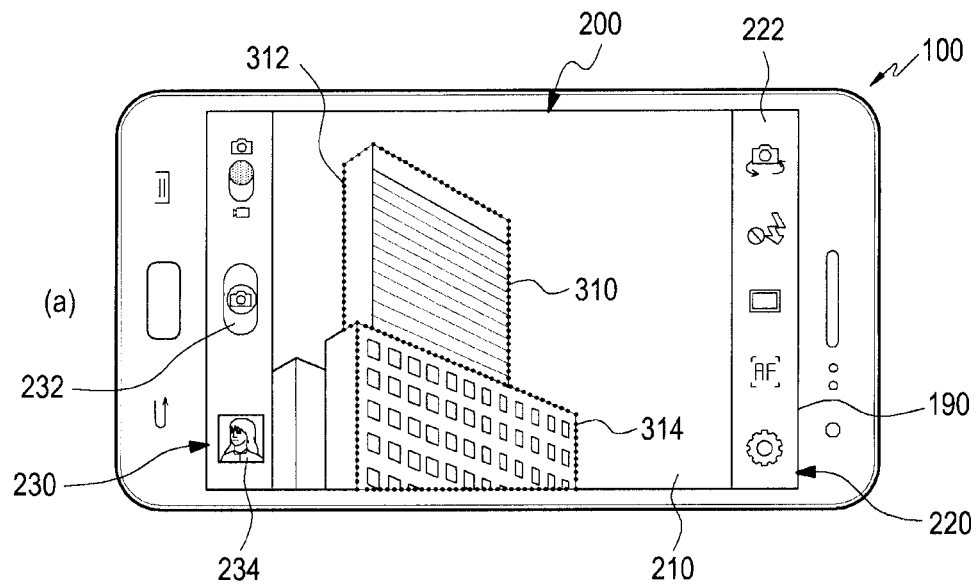
FIG. 6A and FIG. 6B show a diagram illustrating an example of a case where a user selects one of a plurality of candidate Regions of Interest (ROIs) according to invention principles.
Figure 6B:
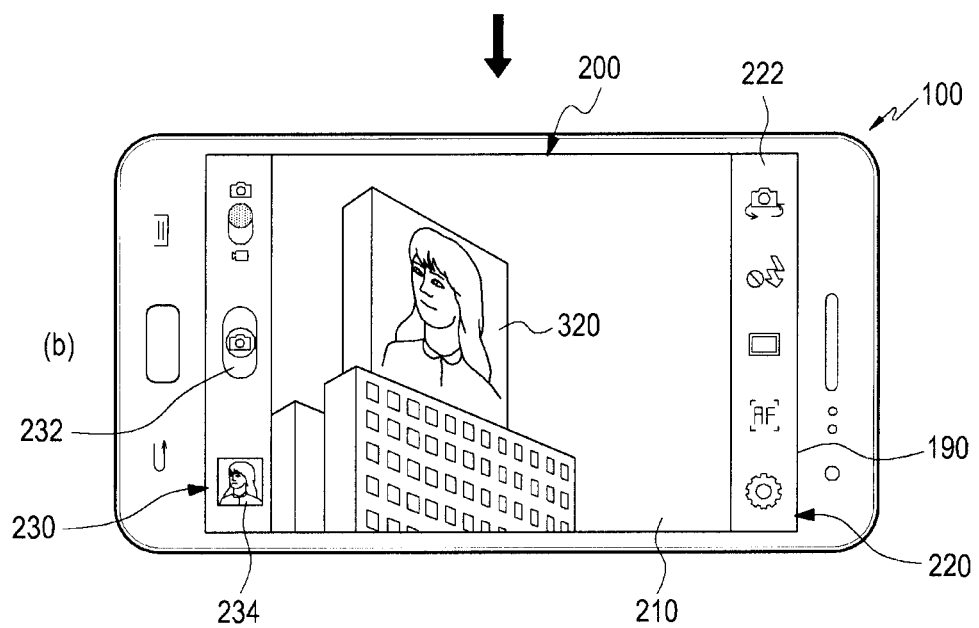

FIGS. 6A and 6B illustrate an example in which the controller displays a plurality of candidate ROIs to a user and the user selects one from the plurality of candidate ROIs. Referring to FIG. 6A, the controller 110 recognizes a first candidate ROI 310 corresponding to a front surface of a rear building in the rear image, a second candidate ROI 312 corresponding to a side surface of the rear building, and a third candidate ROI 314 corresponding to a front surface of a front building, and displays the recognized first, second and third ROIs 310, 312 and 314 to the user. The first, second and third ROIs 310, 312 and 314 are displayed with dotted lines or by another identifying method such as, by using a text overlay, an image, overlay such as an arrow or a visual attribute such as color, highlighting, shade or hashing.

In response to user selection of a first candidate ROI 310 as a final ROI through a touch by the input unit 168 (or a finger), the front image 320 is transformed by scaling, rotation and/or translation operation, for example, and the transformed first image pixel luminance content (i.e., the transformed front image 320) is incorporated into a portion of a second image (i.e., the rear image 210) by image warping, texture mapping, addition, substitution, merging, overlay, superimposition, weighted combination of luminance pixel content or other processing to provide a combined image of the first and second image.

In an embodiment, the transformed front image 320 is overlaid on, or incorporated in, the first candidate ROI 310 to be displayed as illustrated in FIG. 6B. The overlaying or incorporation may be performed by texture mapping, texture warping, substitution, pixel luminance weighted combination and substitution, pixel merging, pixel luminance value addition, or by another known method of replacing an image element with another image element. In various embodiments the image elements from the front image may be combined, substituted, merged or otherwise processed for incorporation in the ROI of the rear image 210 to provide a synthesized image. The warping may adopt forward warping of mapping the image based on each point of the first candidate ROI 310 or backward warping of mapping the image based on each point of the front image 320. The warping method is a known method, so that a detailed description thereof is omitted. In a forward warping process, an ROI image area is excised of image content to provide a hole without image texture content and the excised image area is filled using neighboring texture information. In a backward warping method, different from the forward warping method, an excised image area is not generated eliminating the need for use of neighboring texture information processing for filling an excised image area.

In natural mapping of the front camera image, the texture information (texture, tone, or edges of the surface, for example) of the ROI are reflected to the front image. For example, the front image may be overlaid on the ROI in a semi-transparent state, or the texture image of the ROI may be overlaid on the front image, which is overlaid on the ROI, again in a semi-transparent state.

Figure 7A:
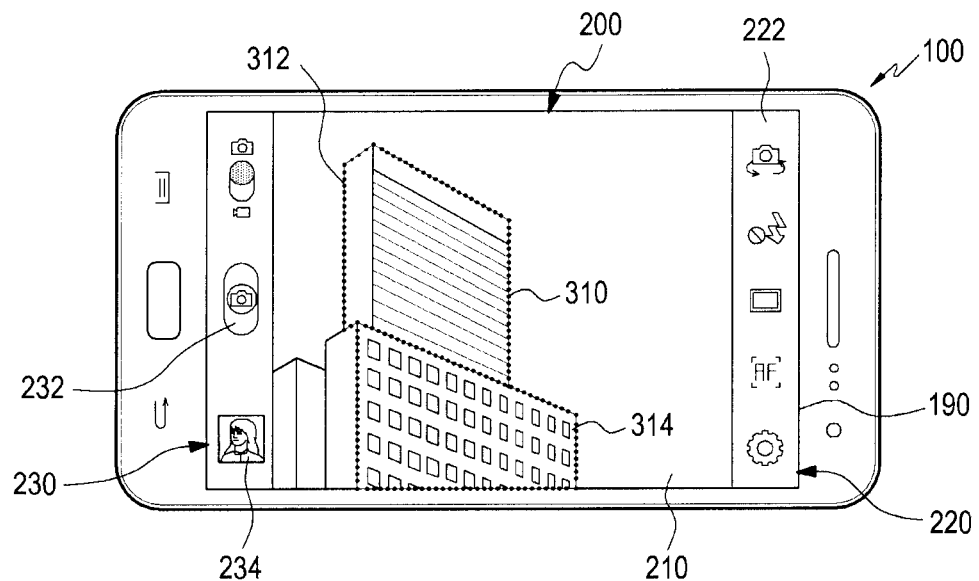
FIG. 7A and FIG. 7B show a diagram illustrating another example of a case where a user selects one of a plurality of candidate ROIs according to invention principles.
Figure 7B:
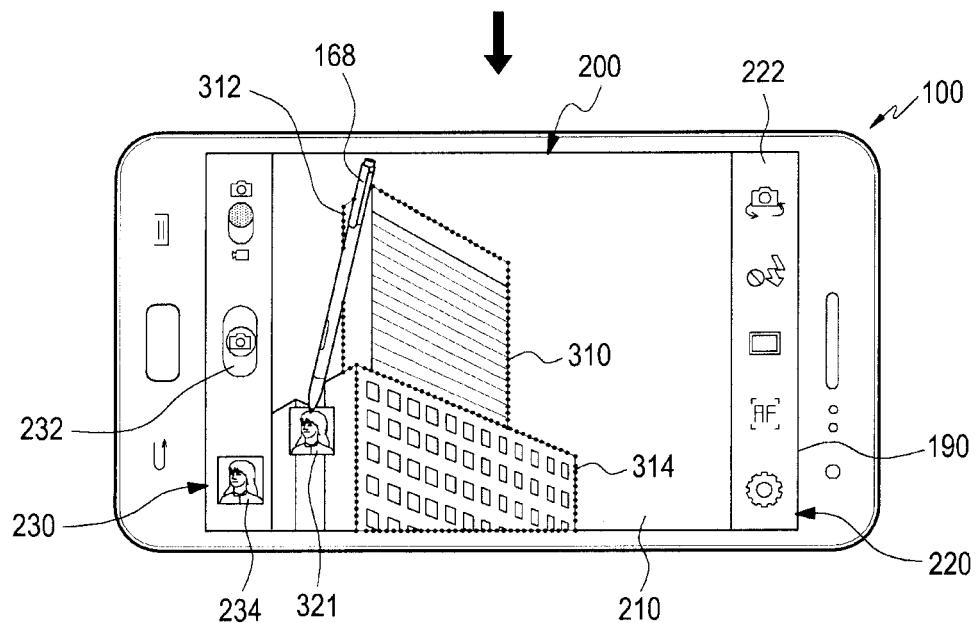

FIGS. 7A and 7B illustrate controller managed display of a plurality of candidate ROIs to a user for user selection of one of the plurality of candidate ROIs. Referring to FIG. 7A, the controller 110 recognizes the first candidate ROI 310 corresponding to the front surface of the rear building in the rear image 210, the second candidate ROI 312 corresponding to the side surface of the rear building, and the third candidate ROI 314 corresponding to the front surface of the front building, and displays the recognized first to third ROIs 310 to 314 to the user using dotted lines.

Figure 8A:
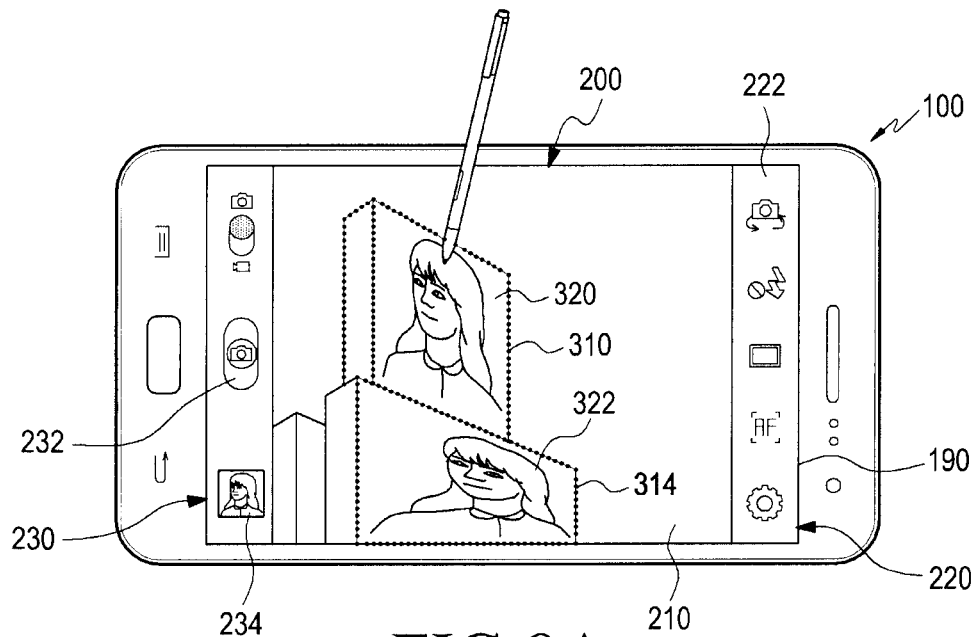
FIG. 8A and FIG. 8B show a diagram illustrating yet another example of a case where a user selects one of a plurality of candidate ROIs according to invention principles.

Referring to FIG. 7B, the user may select and drag the front image displayed in a switched image region 234 with the input unit 168 (or a finger), into one or more of the first to third ROIs 310 to 314. When the user selects the first candidate ROI 310 as the final ROI through a drag operation, the front image 321 is overlaid on the first candidate ROI 310 to be displayed as illustrated in FIG. 8A. The user may perform the drag operation by direct touch or hovering. The end of a drag operation is indicated by a pause in movement of an image object exceeding a predetermined time. The controller 110 stores a position or coordinates of the touch or hovering by continuously tracking the position of a touch or hovering.

Figure 8B:
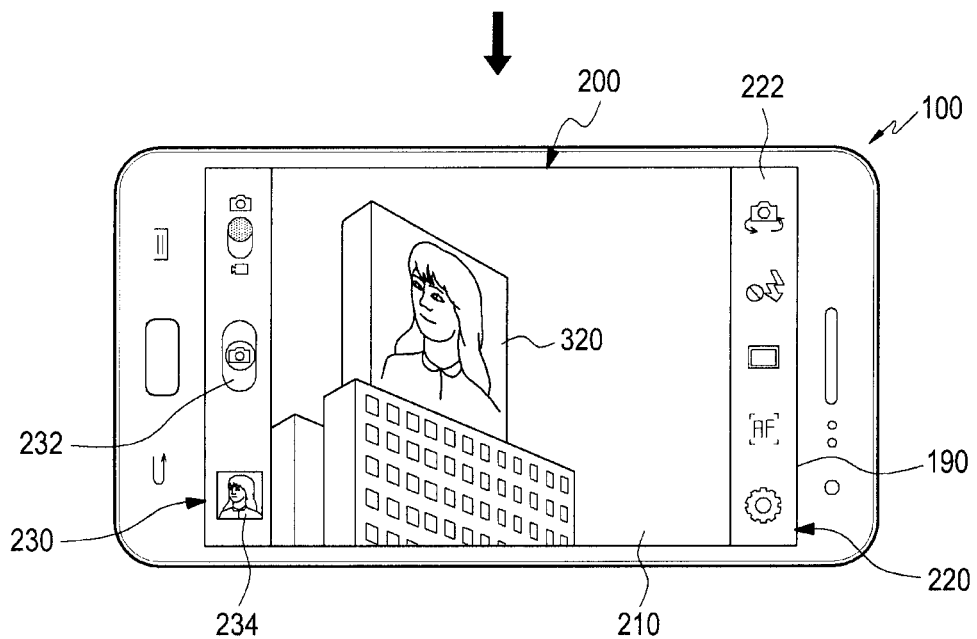

FIGS. 8A and 8B illustrate controller managed display of a plurality of candidate ROIs to a user and user selection of one ROI from the plurality of candidate ROIs. Referring to FIG. 8A, the controller 110 recognizes the first candidate ROI 310 corresponding to the front surface of the rear building in the rear image, and the third candidate ROI 314 corresponding to the front surface of the front building. The controller 110 maps the front images 320 and 322 to the first and third candidate ROIs 310 and 314, respectively, to display the mapped images. In response to user selection of the first candidate ROI 310 as a final ROI through a touch by the input unit 168 (or a finger), the front image 320 is incorporated in the first candidate ROI 310. A user excludes incorporation of the front image in non-selected candidate ROIs by not touching the non-selected candidate ROIs. As illustrated in FIG. 7B, the user may select and drag the front image displayed in the switched image region 234 to one or more of the first and third ROIs 310 and 314 displayed with the dotted lines. In this case, the first candidate ROI 310 is selected as the final ROI with a drag input which starts in the switched image region and ends at the first candidate ROI 310.

Figure 9A:
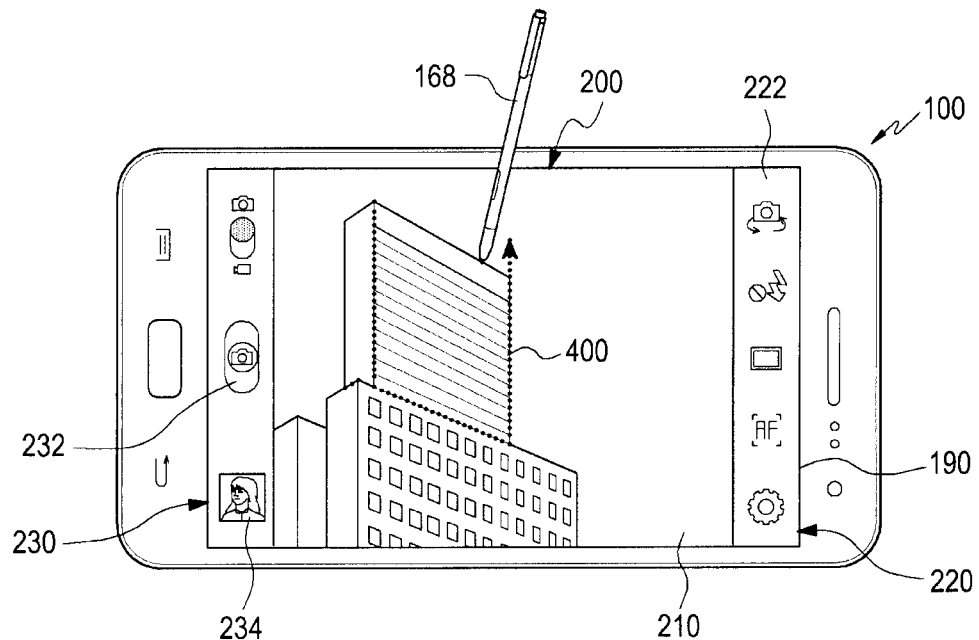
FIG. 9A and FIG. 9B show a diagram illustrating a case where a user directly designates a partial region of a rear image as an ROI as an example according to invention principles.
Figure 9B:
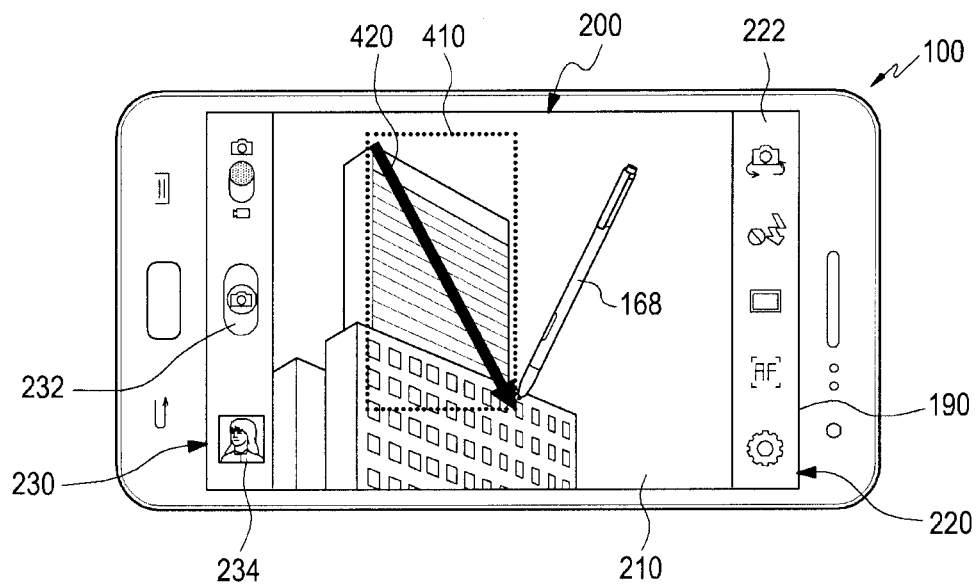

FIGS. 9A and 9B illustrate a user directly designating a partial region of the rear image as the ROI. Referring to FIG. 9A, the user selects an ROI corresponding to a drag trace 400 (indicated with a dotted-line arrow) by dragging and designating a partial region of the rear image 210 with the input unit 168 (or a finger). The controller 110 maps the front image to the selected ROI as shown in FIG. 8B in response to user selection of an OK button on the window. Referring to FIG. 9B, the user employs drag 420 to designate a partial square region 410 of the rear image and the controller 110 recognizes an ROI within the partial region designated by the user. The controller 110 maps the front image to the recognized ROI and display the mapped image. A user may replace a selected ROI with another candidate ROI.

Figure 10A:
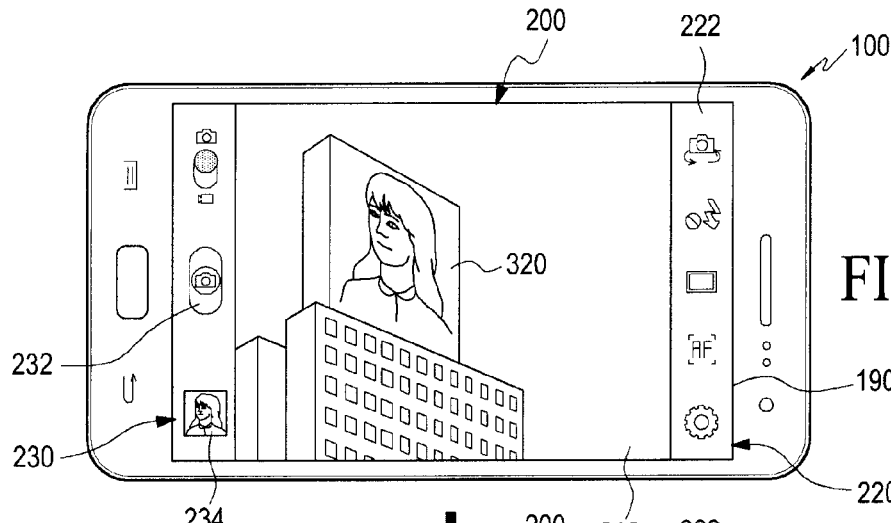
FIG. 10A, FIG. 10B and FIG. 10C show a diagram illustrating a case where a user replaces the ROIs as an example according to invention principles.
Figure 10B:
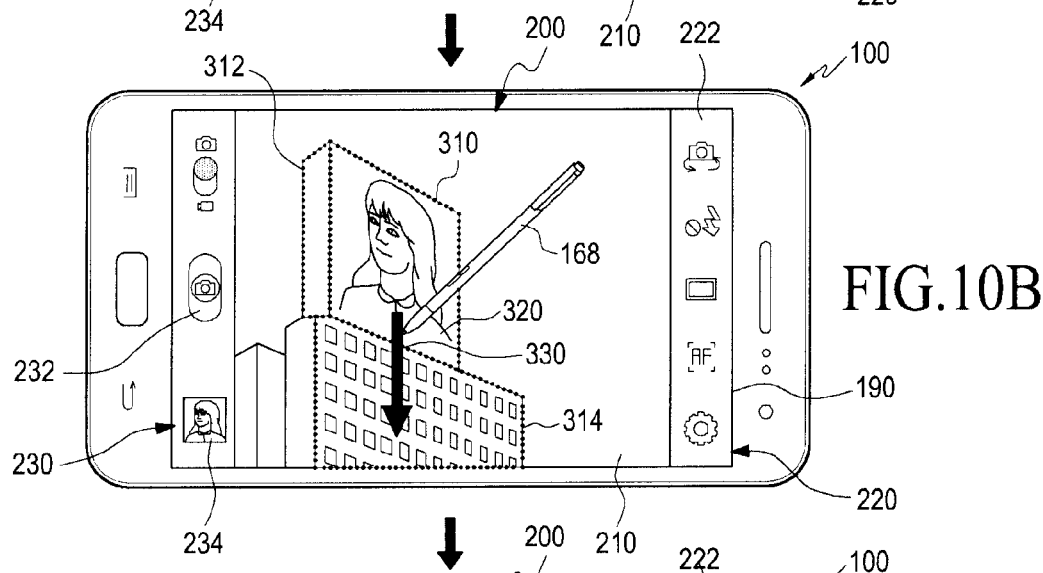
Figure 10C:
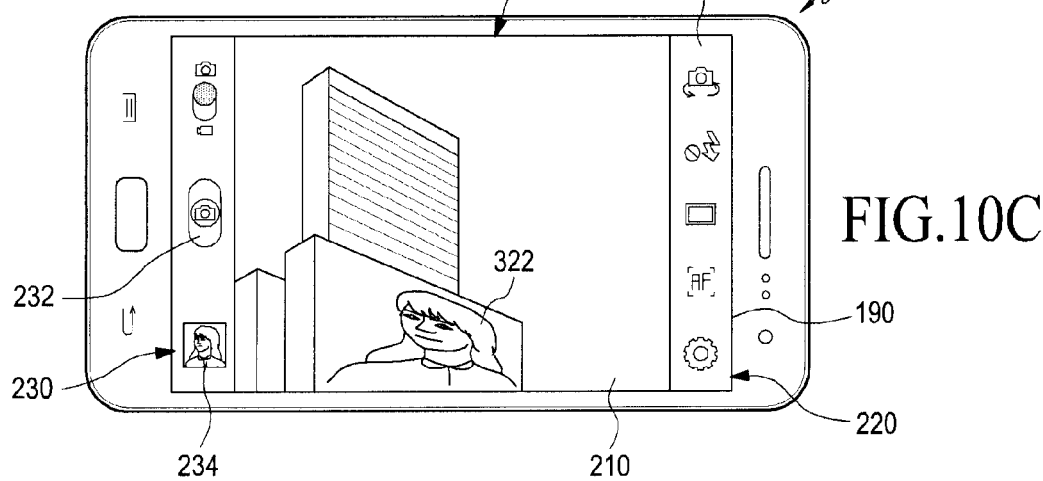

FIGS. 10A, 10B and 10C illustrate user reset of another candidate ROI as a final ROI after setting the first candidate ROI as the final ROI. Referring to FIG. 10A, the first candidate ROI corresponding to a front surface of the rear building in the rear image is set as the final ROI, so that the front image 320 is displayed on the first candidate ROI. Referring to FIG. 10B, in response to user touching the first candidate ROI 310 with the input unit 168 (or a finger) for a predetermined time, the first, second and third ROIs 310, 312 and 314 are displayed. The user may select the third ROI 314 by performing a drag input 330 starting from the first candidate ROI 310 and ending at the third ROI 314. When the user selects the third candidate ROI 314 as the final ROI through the drag 330, the front image 322 is mapped to the third candidate ROI 314 and displayed as illustrated in FIG. 10C. A user is able modify the ROI.

Figure 11A:
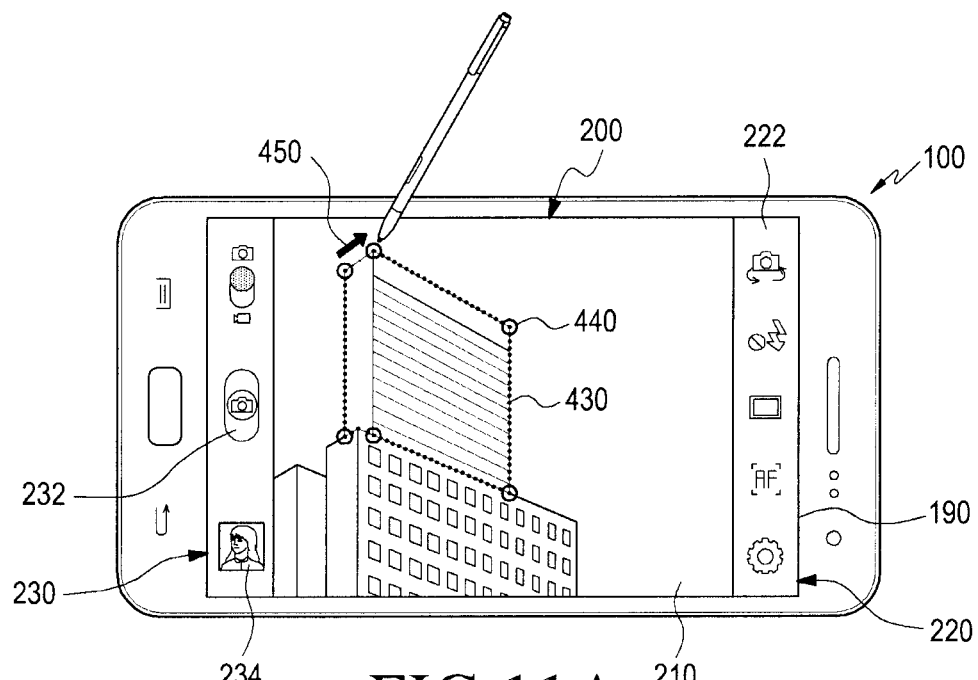
FIG. 11A and FIG. 11B show a diagram illustrating a case where a user modifies the ROI as an example according to invention principles.
Figure 11B:
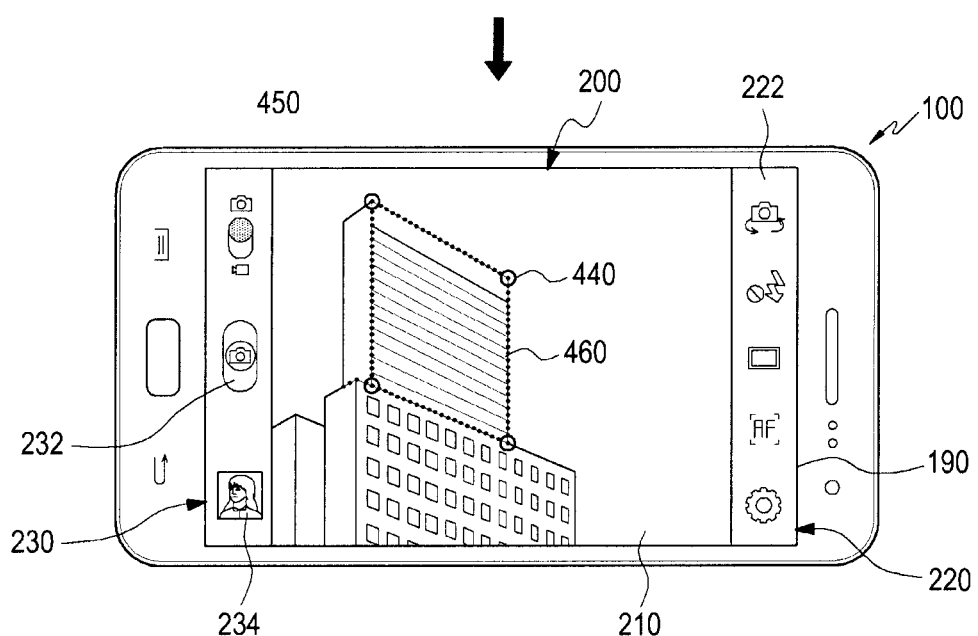

FIGS. 11A and 11B illustrate user modification of the ROIs. Referring to FIG. 11A, a ROI 430 corresponding to the front surface and the side surface in the rear image and having six corner characteristic points 440 is displayed. The user modifies the ROI by performing a selection, a drag 450, or a deletion on the corner characteristic points 440 with the input unit 168 (or a finger). Referring to FIG. 11B, a modified ROI 460 corresponding to the front surface of the rear building and having four corner characteristic points 440 is displayed. The controller 110 automatically selects, as the final ROI, one of the plurality of candidate ROIs which has the largest (or smallest) number of characteristic points or pieces of texture information, or is closest to a desired plane, or has the largest area, among the plurality of candidate ROIs.

Referring to FIG. 4 again, in step S140 the controller 110 tracks the ROI and synthesizes an image by tracking a change in an object part (for example, a front surface of a rear building as shown in FIG. 10A) within the ROI according to a movement of the portable terminal 100 or a movement of the subject, and modifies the ROI in correspondence with the changed object part. Further, the controller 110 maps the front image to the modified ROI and displays the mapped image. In this case, the front and rear images are images acquired at substantially the same time point. The front and rear image in step S130 are images acquired at substantially the same first time point, and the front and rear images in step S140 are images acquired at substantially the same second time point after the first time point. The controller 110 tracks a change in a position, a size, and or a pose of the object part within the ROI, and tracks a change in positions of the corner characteristic points.

Figure 12:
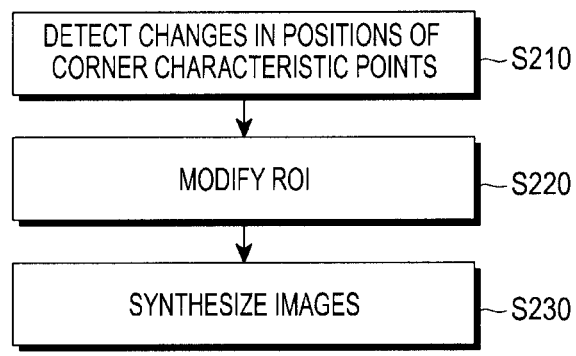
FIG. 12 shows a flowchart of a method illustrating detailed steps of tracking an ROI according to invention principles.

FIG. 12 shows a flowchart of steps of tracking the ROI. In step S210 the controller 110 detects a change in positions of the corner characteristic points of the object part of the ROI. The controller 110 compares a previously acquired rear image and a currently acquired rear image, and detects movement of the corner characteristic points of the object part within the ROI through the comparison. In step S220 the controller 110 modifies the ROI and selects a new ROI defined by the movement of corner characteristic points. In order to select a new ROI, the controller 110 represents the previous ROI with a first matrix consisting of a plurality of dots within the ROI, and calculates a 2D image transform matrix (for example, a 2D homography transform matrix) for transforming the first matrix to a second matrix corresponding to the new ROI. The image transform matrix is calculated based on the positions (that is, coordinates) of the previous corner characteristic points and the positions (that is, coordinates) of the moved corner characteristic points. The controller 110 transforms the first matrix to the second matrix by using the image transform matrix, and the second matrix represents the new ROI.

In step S230 the controller 110 generates an image of the front and rear images by combining the front camera image with the selected ROI of the rear camera image, and displays the generated synthesized image to the user. Referring to FIG. 4 again, in step S150 the controller 110 confirms receiving a user command to store the generated image. The user initiates storing the synthesized generated image 210 (FIG. 6B) by selecting a photography button 232 of the camera application. When the controller 110 receives an instruction to perform image synthesis from the user, the controller 110 in step S160 stores the synthesized image in storage unit 175. The controller 110 repeats steps S140 and S150 until the instruction to perform the photographing is received from the user.

Figure 13A:
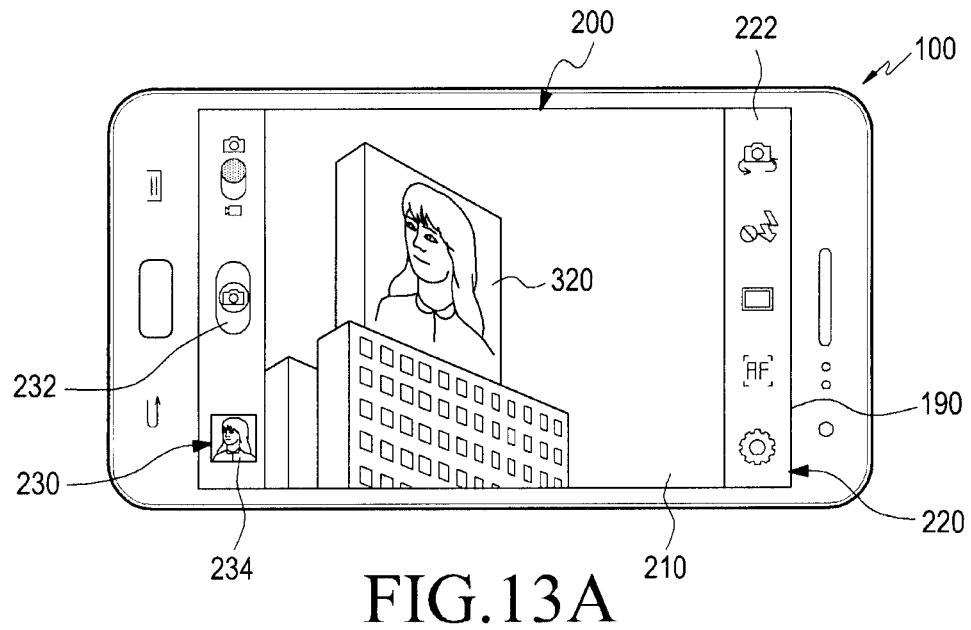
FIG. 13A and FIG. 13B show a diagram illustrating a ROI tracking step according to invention principles.
Figure 13B:
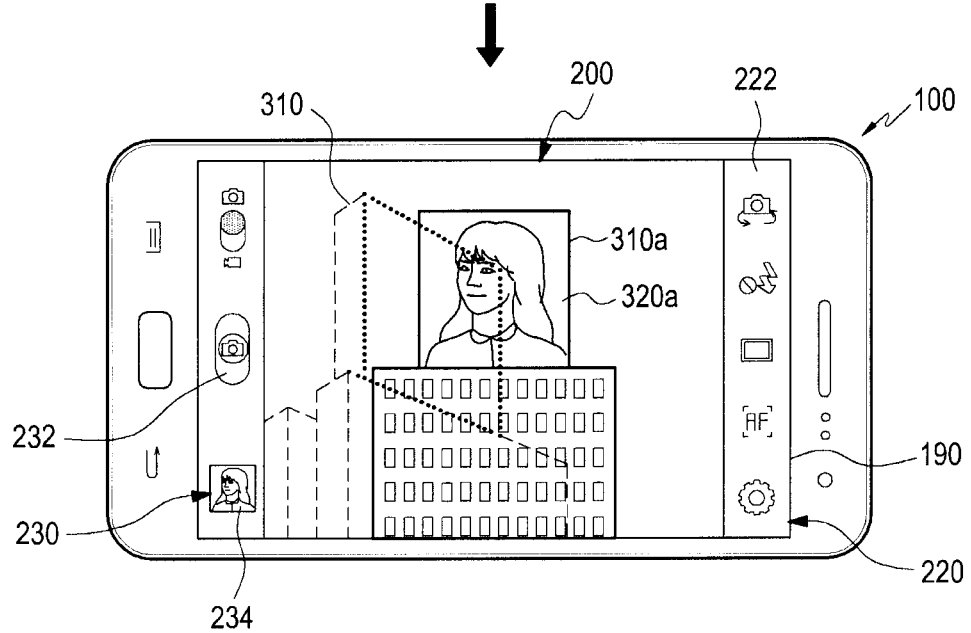

FIGS. 13A and 13B illustrate tracking the ROI and synthesizing the images and shows the front image 320 is displayed in the ROI corresponding to the front surface of the rear building in the rear image 210. The front and rear buildings, which are obliquely viewed in FIG. 13A, are viewed from the front in FIG. 13B in response to movement of portable terminal 100. The ROI 310 and the front image 320 each having a shape of an inclined parallelogram in FIG. 13A are transformed to a new ROI 310a and a new front image 320a each having a rectangular shape in FIG. 13B, respectively. The front and rear buildings and the ROI obliquely viewed in FIG. 13A are indicated with dotted lines in FIG. 13B. The system determines to initiate dual shot mode concurrently with displaying the front image and the rear image by analyzing the rear image acquired by the second camera 152.

Figure 14:
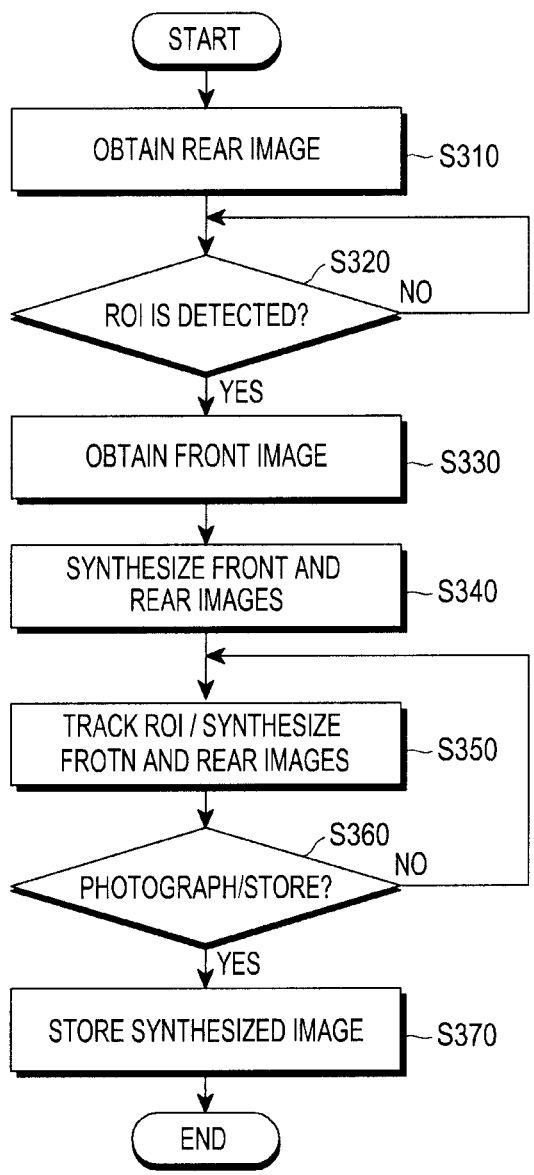
FIG. 14 shows a flowchart illustrating a method of providing a synthesized image according to invention principles.

FIG. 14 shows a flowchart of a method of providing a synthesized image. In step S310 the controller 110 stores the rear image acquired by the second camera 152 in the storage unit 175. The rear image may be a live preview image or a real-time image.

In step S320 the controller 110 identifies whether an ROI is detected in the rear image, when an ROI is detected, the controller 110 performs step S330, and when the ROI is not detected, the controller 110 repeats step S320. In step S330 the controller 110 stores the front image acquired by the first camera 151 in the storage unit 175. The front image may be a live preview image or a real-time image. The storage of the front image may be performed in a previous step. In step S340 the controller 110 generates a synthesized image of the front and rear images by automatically combining (e.g. by overlay, merging, weighted combination or other processing) the front image and a rear image ROI portion, and displays the generated synthesized image to the user. The front image may be displayed to the user after step S340 and first camera 151 may not acquire the front image before the step S330. The front and rear images may be acquired at substantially the same time point.

In step S350 the controller 110 tracks the ROI and synthesizes an image. Specifically, controller 110 tracks a change in an object part within the ROI in response to movement of the portable terminal 100 or a movement of a subject, and transforms the ROI in correspondence with the changed object part. Further, the controller 110 maps the front image to a deformed ROI and displays the mapped image. In this case, the front and rear images are acquired at substantially the same time. The front and rear image in step S340 are images acquired at the substantially same first time point, and the front and rear images in step S350 are acquired at the substantially same second time point after the first time point.

In step S360 the controller 110 confirms whether a user input instruction to store the synthesized image is received. When the controller 110 receives an instruction to perform image synthesis from the user, the controller 110 stores the synthesized image in the storage unit 175 in step S370. The controller 110 repeats steps S350 and S360 until the instruction to perform the image synthesis is received from the user.

In the aforementioned examples, the first camera may be referred to as a front camera, the second camera may be referred to as a rear camera, the front image may be referred to as a first image, and the rear image may be referred to as a second image. Further, in the aforementioned examples, the touch screen is described as a representative example of the display unit, but a typical display unit, such as a Liquid Crystal Display (LCD), an Organic light Emitting Diodes (OLED), and an LED having no touch detecting function may also be used as the display unit instead of the touch screen. The system provides a preview or dual shot photographing by incorporating a front image in a desired area of a rear image. The system improves integrity of front and rear images by synthesizing the front image to a part of a subject included in the rear image, and obtaining a natural synthesized result even though the composition of the rear image is partially changed.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Further, the portable terminal may receive the program from a wired or wirelessly connected program providing device and store the received program. The program providing device may include a program including instructions for performing the method of synthesizing images acquired by the predetermined portable terminal by the portable terminal, a memory for storing information necessary for a method of deleting an item displayed on a touch screen, a communication unit for performing wired or wireless communication with the portable terminal, and a controller for transmitting a corresponding program to the portable terminal according to a request of the portable terminal or automatically.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of generating a synthesized image by combining content of a first image with content of a second image, the first and second images being acquired by a portable terminal, comprising:
    displaying the first and second images;
    setting first and second portions of the second image as first and second regions of interest;
    in response to a first drag input from the first image to the first region of interest, displaying a first synthesized image by incorporating the first image in the first region of interest; and
    in response to a second drag input from the first region of interest to the second region of interest, displaying a second synthesized image by incorporating the first image in the second region of interest,
    wherein the first or second region of interest is defined by corner characteristic points which are automatically recognized in the second image, the corner characteristic points correspond to corners of an object in the second image, the first or second region of interest corresponds to a surface of the object defined by the corners of the object, and each of the corner characteristic points is movable according to a first user input, and
    wherein, when the surface of the object changes, the corner characteristic points are automatically moved according to the changed surface of the object.

2. The method of claim 1, wherein the first and second portions of the second image are determined based on at least one of, texture information about the second image, and learned information pre-stored in a database.

3. The method of claim 1, wherein setting the first and second portions of the second image as the first and second regions of interest comprises:
    displaying a plurality of candidate regions of interest corresponding to portions of the second image; and
    selecting at least one from among the plurality of candidate regions of interest in response to a second user input.

4. The method of claim 1, further comprising:
    detecting a change in the second portion of the second image;
    modifying the second region of interest so as to correspond to the changed second portion of the second image; and
    mapping the first image to the modified second region of interest and displaying the mapped image.

5. The method of claim 1, further comprising:
    detecting a change in positions of corner characteristic points defining the second portion of the second image;
    modifying the second region of interest so as to correspond to the position-changed corner characteristic points; and
    mapping the first image to the modified second region of interest and displaying the mapped image.

6. The method of claim 1, wherein the first or second region of interest corresponds to one surface of a building, and an area of the one surface is limited by corners or edges of the building.

7. The method of claim 1, wherein when the first portion of the second image is identified, the first image is automatically mapped to the first region of interest to be displayed.

8. The method of claim 1, wherein the first and second images are images acquired at substantially the same time.

9. A non-transitory machine-readable storage medium for recording a program for executing a method of generating a synthesized image by combining content of a first image with content of a second image, the first and second images being acquired by a portable terminal, comprising:
    displaying the first and second images;
    setting first and second portions of the second image as first and second regions of interest;
    in response to a first drag input from the first image to the first region of interest, displaying a first synthesized image by incorporating the first image in the first region of interest; and
    in response to a second drag input from the first region of interest to the second region of interest, displaying a second synthesized image by incorporating the first image in the second region of interest,
    wherein the first or second region of interest is defined by corner characteristic points which are automatically recognized in the second image, the corner characteristic points correspond to corners of an object in the second image, the first or second region of interest corresponds to a surface of the object defined by the corners of the object, and each of the corner characteristic points is movable according to a user input, and
    wherein, when the surface of the object changes, the corner characteristic points are automatically moved according to the changed surface of the object.

10. A portable terminal, comprising:
    a first camera that acquires a first image;
    a second camera that acquires a second image;
    a display unit that displays the first and second images on a screen; and
    a controller coupled to and configured for,
    displaying the first and second images;
    setting first and second portions of the second image as first and second regions of interest;
    in response to a first drag input from the first image to the first region of interest, displaying a first synthesized image by incorporating the first image in the first region of interest; and
    in response to a second drag input from the first region of interest to the second region of interest, displaying a second synthesized image by incorporating the first image in the second region of interest,
    wherein the first or second region of interest is defined by corner characteristic points which are automatically recognized in the second image, the corner characteristic points correspond to corners of an object in the second image, the first or second region of interest corresponds to a surface of the object defined by the corners of the object, and each of the corner characteristic points is movable according to a first input, and
    wherein, when the surface of the object changes, the corner characteristic points are automatically moved according to the changed surface of the object.

11. The portable terminal of claim 10, wherein the first or second region of interest corresponds to one surface of a building or a subject, and an area of the one surface is limited by corners or edges of the building.

12. The portable terminal of claim 10, wherein the controller is configured for:
    displaying a plurality of candidate regions of interest corresponding to portions of the second image; and
    selecting at least one from among the plurality of candidate regions of interest in response to a second user input.

13. The portable terminal of claim 10, wherein the controller is configured for:
    detecting a change in the second portion of the second image;

modifying the second region of interest so as to correspond to the changed second portion of the second image; and mapping the first image to the modified second region of interest and displaying the mapped image.

* * * * *